March 5, 1935. G. A. PERKINS 1,993,681
SEPARATION OF DIOLEFINES FROM HYDROCARBON MIXTURES
Filed April 24, 1931
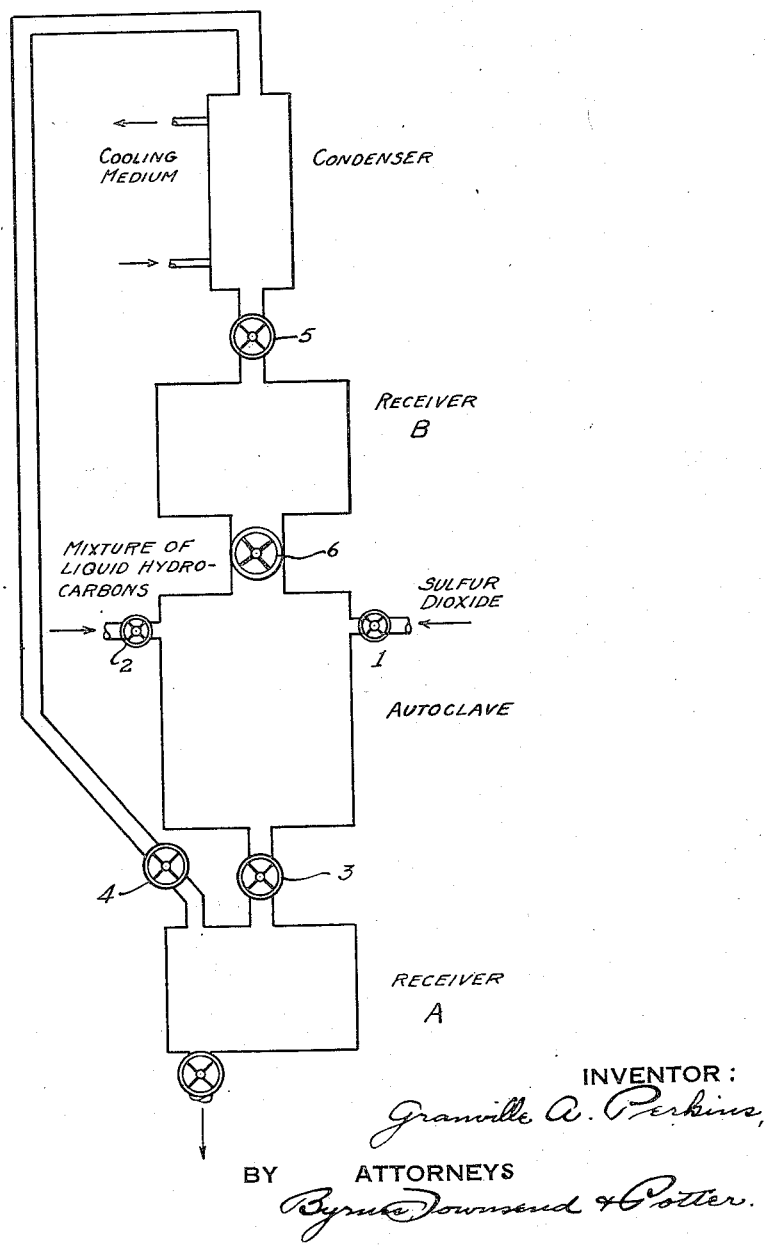
INVENTOR:
Granville A. Perkins,
BY ATTORNEYS
Byrnes Townsend & Potter.

Patented Mar. 5, 1935

1,993,681

UNITED STATES PATENT OFFICE 1,993,681

SEPARATION OF DIOLEFINES FROM HYDROCARBON MIXTURES

Granville A. Perkins, South Charleston, W. Va., assignor to Carbide and Carbon Chemicals Corporation, a corporation of New York Application April 24, 1931, Serial No. 532,677

15 Claims. (Cl. 260—171)

The invention is a process for separating diolefines from hydrocarbon mixtures and especially for separating diolefines having conjugated double bonds from mixtures which are rich in olefines, such as those produced by the vapor-phase cracking of petroleum or petroleum fractions.

In general, my process comprises forming, from diolefines and sulfur dioxide, monomeric addition products which are crystalline and soluble, and from which the original diolefine may be easily regenerated. The combination is caused to take place under appropriate conditions without the use of a catalyst or restrainer and in a manner which minimizes the formation of insoluble, amorphous addition products.

The principal object of my invention is to provide a process for separating diolefines from hydrocarbon-mixtures, especially mixtures containing olefines, as compounds from which the diolefines are easily recovered, and in a manner which does not materially affect the other constituents of the mixture. Another object is the separation of diolefines from olefines as a step in processes which also include sulfating the olefines and preparing alcohols therefrom. Still another object is to provide means for purifying diolefine hydrocarbons.

The utilization of olefine-containing hydrocarbons to form alkyl sulfates from which alcohols may be prepared is an established art. Most processes for preparing alkyl sulfates from the olefines of mixtures containing diolefines have made no provision for the recovery and use of diolefines. The diolefines are more reactive with sulfuric acid than are some of the olefines, and the method usually recommended for effecting their removal is the polymerization of the diolefines at some stage of the sulfation process. This results in a conversion of the diolefines into practically worthless material and in addition lowers the efficiency of the process in forming alkyl sulfates.

It has been proposed to purify diolefines by various methods including the reaction of diolefines with sulfur dioxide. The chief difficulty of this latter process lies in the fact that when sulfur dioxide reacts with a diolefine, there is a marked tendency toward the formation of an insoluble amorphous product which does not yield the diolefine upon decomposition. It has been proposed to prevent the formation of this product by the use of a catalyst or restraining agent. I have found that formation of the amorphous product can be substantially avoided without the use of a catalyst or restraining agent. I accomplish this result by avoiding a large excess of sulfur dioxide or by causing the hydrocarbon mixture to be contacted with small amounts (less than one-half its weight) of sulfur dioxide in step-wise fashion. The diolefine is converted to the crystalline product, the latter being removed from the zone of reaction as it is formed.

The method of practicing the process of the present invention is illustrated by the following examples and the accompanying diagram.

I. The preferred embodiment of my process is operated as a continuous cycle and the flow of materials in this preferred cycle is shown in the diagram.

A liquefied hydrocarbon fraction boiling between —5.6° C. and —4.6° C., obtained by the fractional distillation of cracked petroleum hydrocarbons, was admitted to an autoclave by means of a feed pipe controlled by the valve 2. Sulfur dioxide was similarly admitted to the autoclave by means of a feed pipe controlled by the valve 1. The amount of the hydrocarbons was 9.3 kilograms, and the amount of sulfur dioxide was 2.6 kilograms. The autoclave was then closed and heated for 18 hours at 100° C. At the end of this time, valve 3 was opened and 8 liters of liquid were drawn off from the bottom of the autoclave into the receiver A and valve 3 was again closed. Valves 4 and 5 were then opened, and the receiver A was heated to about 80° C. The condenser was supplied with cooling water at about 20° C. and the volatile material drawn from the autoclave was distilled from receiver A, condensed, and collected in receiver B. Valves 4 and 5 were then closed and valve 6 was opened to allow the material in receiver B to reenter the autoclave.

When the distillation was finished, the receiver A was found to contain 1.5 kilograms of butadiene-sulfur dioxide addition compound which crystallized when cooled below its melting point of 62° C. This material was water-soluble and dissociated readily into butadiene and sulfur dioxide when heated to 120° C.

Two and three-tenths kilograms of sulfur dioxide was added to the residual material in the autoclave and heating of the mixture continued as before. At the end of a second 18 hour period, the process of drawing off the liquid was repeated and 1.6 kilograms of crystalline addition product was obtained. The heating of the autoclave and the drawing off process were repeated three times without the addition of more sulfur dioxide. After the fifth and final heating the whole mixture was drawn off. Only 130 grams of non-volatile product was obtained upon distillation of the final liquid. The total quantity of butadiene-sulfur dioxide addition product, which was equivalent to the butadiene initially present, was 4.1 kilograms.

II. The process of Example I was varied by drawing liquid from the autoclave through valve 3 continuously into receiver A. In this case receiver B was relatively smaller in size and was allowed to fill and discharge into the autoclave intermittently, valves 5 and 6 never being opened at the same time because the pressure in the autoclave exceeds the pressure in the condenser.

A pump also may be employed to force distillate from receiver A into the autoclave, if desired.

III. The process of the first example may be varied by omitting the condenser and the receiver B from the system. This makes the process intermittent, the receiver A being connected to the top of the autoclave and the latter being cooled to about 20° C. when the volatile products drawn off are distilled back into the autoclave.

IV. The process of either Example I, II or III may be carried out with a single addition of sulfur dioxide. This is possible only when the hydrocarbon mixture contains 15% or less of diolefines in which case an addition of about 25% of sulfur dioxide is preferred.

The process may be modified to suit the hydrocarbon mixture employed. Hydrocarbon fractions which are higher-boiling than the one described are usually somewhat more reactive with sulfur dioxide and temperatures less than 100° C. are preferred for their treatment.

I have found that in many cases nearly all of the addition product separates at the bottom of the reacting mixture as an immiscible liquid layer containing a little free hydrocarbon and much free sulfur dioxide. In the drawing-off operation it is usually sufficient to draw off this layer. If this liquid is cooled, nearly all of the addition product crystallizes out. Therefore, filtration may be used instead of the distillation described to separate the addition product from uncombined sulfur dioxide and other associated substances.

Other variations from the process described will be apparent and are included within my invention, as defined in the appended claims.

I claim:—

1. A process for separating diolefines from hydrocarbon mixtures which comprises heating the hydrocarbon mixture with less than one-half its weight of sulfur dioxide at an elevated temperature not substantially above around 100° C. and under superatmospheric pressure, and removing the diolefine-sulfur dioxide addition product formed from the zone of reaction.

2. A process for separating diolefines from hydrocarbon mixtures which comprises successively treating the mixture with small amounts of sulfur dioxide at an elevated temperature not higher than around 100° C. and at superatmospheric pressure, and removing diolefine-sulfur dioxide addition products from the zone of reaction after each treatment.

3. A process for separating diolefines from hydrocarbon mixtures which comprises subjecting the hydrocarbon mixture in the liquid state to the action of a small amount of sulfur dioxide at a temperature of about 100° C., and at a pressure greater than atmospheric, continuously removing a portion of said liquid mixture from the zone of reaction, separating diolefine-sulfur dioxide addition products from said portion, returning the balance of said portion to the zone of reaction and maintaining the amount of sulfur dioxide in the zone of reaction substantially constant and less than one-half of the weight of the hydrocarbons present therein at all times.

4. A process for separating diolefines from hydrocarbon mixtures which comprises heating the hydrocarbon mixture with less than one-half its weight of sulfur dioxide at a pressure greater than atmospheric and a temperature of about 100° C. and removing the addition product formed from the zone of reaction.

5. A process for separating diolefines from hydrocarbon mixtures in a form from which the diolefines easily may be regenerated which comprises heating the hydrocarbon mixture for about 18 hours at a temperature of about 100° C. and at a pressure greater than atmospheric with less than one-half its weight of sulfur dioxide and removing the addition product formed from the zone of reaction.

6. A process for separating diolefines from hydrocarbon mixtures which comprises successively treating the mixture at a temperature of about 100° C., and at a pressure greater than atmospheric with small amounts of sulfur dioxide and removing the addition product from the zone of reaction after each treatment.

7. A process for separating diolefines from hydrocarbon mixtures in a form from which the diolefine may be easily recovered which comprises successively treating the mixture with small amounts of sulfur dioxide at a pressure greater than atmospheric and at a temperature of about 100° C. and removing the addition product from the zone of reaction.

8. A process for separating diolefines from hydrocarbon mixtures which comprises subjecting the hydrocarbon mixture in the liquid state to the action of a small amount of sulfur dioxide at a temperature of about 100° C. in a closed system, continuously removing a portion of said liquid mixture from the zone of reaction, separating diolefine-sulfur dioxide addition products from said portion, returning the balance of said portion to the zone of reaction and maintaining the amount of sulfur dioxide in the zone of reaction substantially constant and less than one-half the weight of the hydrocarbons present in the system.

9. A process for separating diolefines from hydrocarbon mixtures which comprises subjecting the hydrocarbon mixture in the liquid state to the action of a small amount of sulfur dioxide at a temperature of about 100° C. in a closed system, continuously removing a portion of said liquid mixture from the zone of reaction, separating diolefine-sulfur dioxide addition products from said portion, by filtration, returning the balance of said portion to the zone of reaction and maintaining the amount of sulfur dioxide in the zone of reaction substantially constant and less than one-half the weight of the hydrocarbon present in the system.

10. A process for separating diolefines from hydrocarbon mixtures which comprises subjecting the hydrocarbon mixture in the liquid state to the action of a small amount of sulfur dioxide at a temperature of about 100° C. in a closed system, continuously removing a portion of said liquid mixture from the zone of reaction, separating diolefine-sulfur dioxide addition products from said portion by distillation below 100° C., returning the volatile components of said portion to the zone of reaction and maintaining the amount of sulfur dioxide in the zone of reaction substantially constant and less than one-half the weight of the hydrocarbons present in the system.

11. A process of separating diolefines from a hot mixture of hydrocarbons, which comprises successively treating a hot mixture of hydrocarbons at an elevated temperature and under superatmospheric pressure with small amounts of sulfur dioxide, the amount of sulfur dioxide used in each of the respective treatments being less than one-half the weight of the hydrocarbon mixture, and removing the resultant crystalline diolefine-sulfur dioxide addition product from the reaction zone after each treatment.

12. A process for separating diolefines from a hydrocarbon mixture, which comprises subjecting the mixture to successive treatments with small amounts of sulfur dioxide in the absence of a catalyst, at an elevated temperature not substantially above 100° C., and under superatmospheric pressure.

13. A process for separating diolefines from hydrocarbon mixtures which comprises subjecting the mixture to successive treatments with small amounts of sulfur dioxide in the absence of a catalyst at a temperature of about 100° C. and at a pressure greater than atmospheric.

14. A process for separating diolefines from a hydrocarbon mixture which comprises successively treating the mixture in stages at an elevated temperature not in excess of about 100° C. and under superatmospheric pressure with successively smaller amounts of sulfur dioxide, and removing the resultant addition product from the zone of reaction after each treatment, the amount of sulfur dioxide used in the first of said treatments being less than one-half the weight of the hydrocarbon mixture.

15. A process for separating diolefines from a hydrocarbon mixture which comprises successively treating the mixture in stages at an elevated temperature around 100° C. and under superatmospheric pressure with successively smaller amounts of sulfur dioxide, and removing the resultant addition product from the zone of reaction after each treatment, the amount of sulfur dioxide used in the first of said treatments being less than one-half the weight of the hydrocarbon mixture.

GRANVILLE A. PERKINS.